United States Patent [19]
Abe et al.

[11] Patent Number: 5,793,529
[45] Date of Patent: Aug. 11, 1998

[54] REAL IMAGE TYPE VIEWFINDER

[75] Inventors: Tetsuya Abe, Hokkaido; Sachio Hasushita; Takayuki Ito, both of Tokyo, all of Japan

[73] Assignee: Asahi Kogaku Kogyo Kabushiki Kaisha, Tokyo, Japan

[21] Appl. No.: 590,558

[22] Filed: Mar. 21, 1996

Related U.S. Application Data

[62] Division of Ser. No. 273,873, Jul. 12, 1994, Pat. No. 5,550,674.

[30] Foreign Application Priority Data

Jul. 12, 1993 [JP] Japan ............................ 5-171608

[51] Int. Cl.$^6$ ............................ G02B 23/00; G02B 15/14
[52] U.S. Cl. ............................ 359/422; 359/431; 359/432; 359/691
[58] Field of Search .................... 359/362, 421, 359/432, 431, 676, 677, 691, 793, 708; 354/219–225; 396/373–386

[56] References Cited

U.S. PATENT DOCUMENTS

| | | | |
|---|---|---|---|
| 4,265,529 | 5/1981 | Yokota | 354/224 |
| 4,842,395 | 6/1989 | Sato et al. | 359/422 |
| 5,034,763 | 7/1991 | Inabata | 354/219 |
| 5,086,353 | 2/1992 | Mukai et al. | 359/422 |
| 5,132,838 | 7/1992 | Ohshita | 359/422 |
| 5,136,427 | 8/1992 | Sugawara | 359/646 |
| 5,191,477 | 3/1993 | Abe et al. | 359/695 |
| 5,193,030 | 3/1993 | Nozaki et al. | 359/687 |
| 5,216,457 | 6/1993 | Yamaguchi et al. | 354/222 |
| 5,235,460 | 8/1993 | Abe | 359/431 |
| 5,255,123 | 10/1993 | Estelle | 359/684 |
| 5,309,286 | 5/1994 | Abe et al. | 359/695 |
| 5,410,430 | 4/1995 | Ito et al. | 359/422 |
| 5,434,636 | 7/1995 | Hasushita et al. | 354/219 |
| 5,513,043 | 4/1996 | Abe et al. | 359/422 |
| 5,550,674 | 8/1996 | Abe et al. | 359/422 |

FOREIGN PATENT DOCUMENTS 2-304409   12/1990   Japan.

*Primary Examiner*—Thong Nguyen
*Attorney, Agent, or Firm*—Greenblum & Bernstein P.L.C.

[57] ABSTRACT

A real image type viewfinder is provided with, in the following order from the object side: an objective lens group, a condenser lens group which transmits the image of the object formed by the objective lens group towards an eyepiece lens group, an image erecting optical system that erects an inverted image, and, an eyepiece lens group. The eyepiece lens group consists of a negative lens and a positive double-convex lens, in this order from the eye side, and satisfies the following three relationships:

$$-0.5 < f_E/f_{E1} < 0 \quad (1)$$

$$-1.5 < f_E/r_{E1} < 1.0 \quad (2)$$

$$0.03 < d_{E1-2}/f_E < 0.1 \quad (3)$$

wherein $f_E$ designates the overall focal length of the eyepiece lens group; $f_{E1}$ designates the focal length of the negative lens of the eyepiece lens group; $r_{E1}$ designates the radius of the eye-side surface curvature of the negative lens of the eyepiece lens group; and $d_{E1-2}$ designates the distance between the negative lens and the positive double-convex lens of the eyepiece lens group.

2 Claims, 8 Drawing Sheets

REAL IMAGE TYPE VIEWFINDER

This application is a division of application Ser. No. 08/273,873, filed Jul. 12, 1994, now U.S. Pat. No. 5,550,674.

BACKGROUND OF THE INVENTION

1. Field of the Invention

The present invention relates to a real image type viewfinder.

2. Description of Related Art

In a conventional real image type viewfinder used for a compact camera, the eyepiece lens system is usually formed as a single positive lens. However, this type of eyepiece lens system consisting of a single positive lens tends to have a long focal length in order to provide space for the prism system which erects the object image. Particularly, with a wide angle objective lens system, the angular magnification of the this type of viewfinder system tends to be small.

The conventional art disclosed in Japanese Unexamined Patent Publication Ser.No. Hei 2-304409 proposes an eyepiece lens system including a negative meniscus lens and a positive lens in this order from the eye side. However, in this eyepiece lens system, since the negative meniscus lens on the eye side has a concave surface having a large curvature (i.e., small radius) towards the eye, the light rays from a bright light source located on the eye side will be reflected upon the concave surface of the negative meniscus lens, and will be converged and incident upon the eye of the observer, thus interfering with the observer's view. Furthermore, with the negative meniscus lens on the eye side having a concave surface with a large curvature towards the eye, it would be difficult to have a long effective distance between the lens frame and the eye. In other words, it would be difficult to obtain a long eye-relief distance.

SUMMARY OF THE INVENTION

It is an object of the present invention to provide a real image viewfinder in which the above-mentioned problems of the eyepiece of the real image viewfinder system can be solved and which has enough space for the image erecting element or a finder viewing field switching mechanism (e.g., panorama format switching mechanism). The real image viewfinder of the present invention further prevents the light rays from a bright light source on the side of the eye from reflecting into the photographer's eye, and yet further is capable of adjusting the diopter deviation of the objective lens, which are caused by manufacturing processes or diopter variations caused by individual differences of observers' eyesights, or environmental variations such as temperature, humidity, etc.

Another objective of the present invention is to provide a small real image viewfinder including a variable focal length objective lens system having a wide effective half angle of view of 17 to 32 degrees.

According to the present invention, a real image type viewfinder is provided with, in the following order from an object, an objective lens group; a condenser lens group which transmits the image of the object formed by the objective lens towards an eyepiece lens group; an image erecting optical system that erects an inverted image; and an eyepiece lens group. The eyepiece lens group consists of a negative lens and a positive double-convex lens in this order from the eye side, and satisfies the following three conditional formulas:

$$-0.5 < f_E/f_{E1} < 0 \quad (1)$$

$$-1.5 < f_E/r_{E1} < 1.0 \quad (2)$$

$$0.03 < d_{E1-2}/f_E < 0.1 \quad (3)$$

wherein $f_E$ designates the overall focal length of the eyepiece lens group; $f_{E1}$ designates the focal length of the negative lens of the eyepiece lens group; $r_{E1}$ designates the radius of the eye-side surface curvature of the negative lens of the eyepiece lens group; and $d_{E1-2}$ designates the distance between the negative lens and the positive double-convex lens of the eyepiece lens group.

The double-convex lens of the eyepiece lens group can be made to be movable in the optical axis direction to adjust the diopter.

According to another aspect of the present invention, a real image type viewfinder is provided with, in the following order from the object side, an objective lens group; a condense lens group which transmits the image of the object formed by the objective lens towards an eyepiece lens group; an image erecting optical system that erects an inverted image; and, an eyepiece lens group. The objective lens group consists of a first negative lens group and a second positive lens group located in this order from the object side which together form a movable variable focal length lens group satisfying the following two conditional formulas:

$$-2.5 < f_E/f_{1G} < -1.5 \quad (4)$$

$$1.3 < f_E/f_{2G} < 2.3 \quad (5)$$

wherein $f_{1G}$ designates the focal length of the first negative lens group and $f_{2G}$ designates the focal length of the second positive lens group.

According to yet another aspect of the present invention, a real image type viewfinder is provided with, in the following order from the object side: an objective lens group; a condenser lens group which transmits the image of the object formed by the objective lens towards an eyepiece lens group; an image erecting optical system that erects an inverted image; and, an eyepiece lens group. The objective lens group consists of a first negative lens group and a second positive lens group located in this order from an object side which together form a movable variable focal length lens group, the first negative lens group comprising a double-aspheric lens which satisfies the following two conditional formulas:

$$-0.05 < \Delta X_{1-1}/f_{0W} < 0 \quad (6)$$

$$-0.10 < \Delta X_{1-2}/f_{0W} < 0 \quad (7)$$

wherein, $\Delta X_{1-1}$ designates the aspheric value in the effective radius of a first surface of the double-aspheric lens; $\Delta X_{1-2}$ designates the aspheric value in the effective radius of a second surface of the double-aspheric lens; and, $f_{0W}$ designates the overall focal length of the lens groups from the objective lens group to the condenser lens group at a wide angle setting.

The second positive lens group of the objective lens group can comprise a positive lens and a negative lens.

In the real image type viewfinder according to the present aspect of the invention, it is preferred to use a weak power aberration correction lens between the variable focal length lens group and the condenser lens group which satisfies the following conditional formula:

$$f_{0W}/|f_F| < 0.2 \quad (8)$$

wherein $f_F$ designates the focal length of the aberration correction lens.

It is preferred that the aberration correction lens comprises a double-aspheric lens which satisfies the following two conditional formulas:

$$-0.1 < \Delta X_{c-1}/f_{0W} < 0 \qquad (9)$$

$$-0.15 < \Delta X_{c-2}/f_{0W} < 0 \qquad (10)$$

wherein $\Delta X_{c-1}$ designates the aspheric value in the effective radius of a first surface of the aberration correction lens and $\Delta X_{c-2}$ designates the aspheric value in the effective radius of a second surface of the aberration correction lens.

The shape of the aspheric surface can be generally expressed as follows:

$$X = \frac{CY^2}{1 + \{1 - (1 + K)C^2Y^2\}^{1/2}} + A_4Y^4 + A_6Y^6 + A_8Y^8 + A_{10}Y^{10} + \ldots$$

wherein, Y represents a height above the axis,

X represents a distance from a tangent plane of an aspherical vertex,

C represents a curvature of the aspherical vertex (1/r),

K represents a conic constant, $A_4$ represents a fourth-order aspherical aberration factor, $A_6$ represents a sixth-order aspherical aberration factor, $A_8$ represents a eighth-order aspherical aberration factor; and, $A_{10}$ represents a tenth-order aspherical aberration factor.

It is noted that subsequent references to the aspherical aberration factors may refer to the same using subscripted or non-subscripted reference numerals (e.g., A8 may be used equivalently to $A_8$).

According to the present invention, a real image type viewfinder can make an angular magnification of the overall finder optics large and obtain enough space for an image erecting optical system. Also a real image type viewfinder according to the present invention does not reflect light rays from bright light sources from the eye side. A real image type viewfinder according to the present invention can adjust the diopter deviations caused by the manufacturing processes of the objective lens group, by the individual visual power of an observer or by the environmental conditions such as temperature and/or humidity.

The present disclosure relates to subject matter contained in Japanese patent application No. 05-171608 (filed on Jul. 12, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
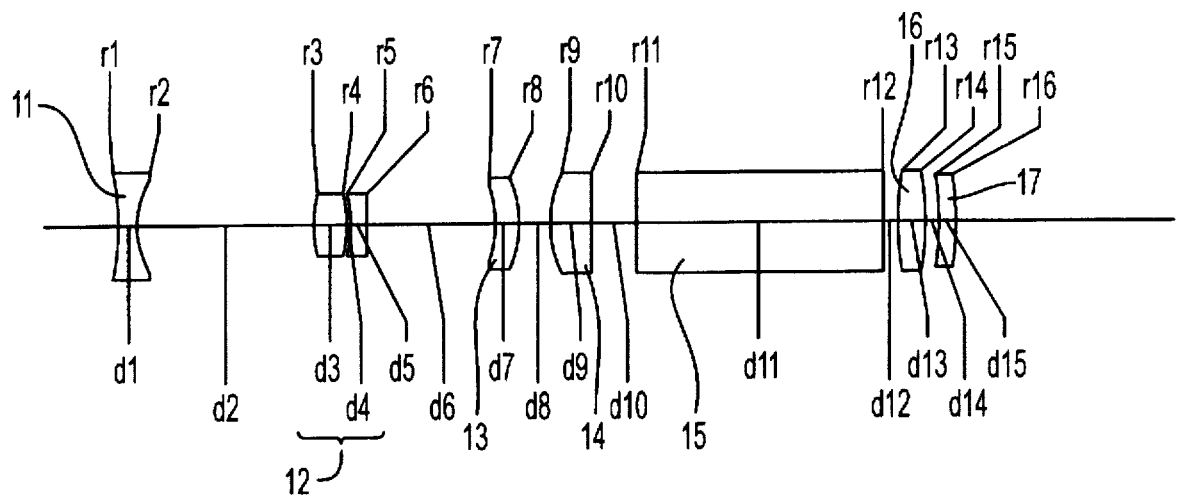
FIG. 1 is a diagram of a first embodiment of a real image type viewfinder showing wide angle settings according to the present invention.

A real image viewfinder according to the present invention includes from the object side, an objective lens group, a condenser lens group which transmits the image of the object from said objective lens group towards an eyepiece lens group, an image erecting optical system which erects an inverted image, and an eyepiece lens group. The eyepiece lens group includes from the eye side, a negative lens and a positive double-convex lens. The eyepiece lens groups, having the above arrangement in which a negative lens and a positive lens are placed from the eye side, is effective to widen the angular magnification of the overall viewfinder optics.

The conditional formula (1) $-0.5 < f_E/f_{E1} < 0$, wherein $f_E$ designates the overall focal length of the eyepiece lens group and $f_{E1}$ designates the focal length of the negative lens of the eyepiece lens group, is related to the power of the negative lens on the eye side of the eyepiece lens group. If the value of this formula is above the upper limit, the angular magnification tends to be too small; this is not preferred in relation with the conditional formula (3), because the diopter adjustment range of the positive double-convex lens becomes narrower. If the value is below the lower limit of formula (1), both powers of the negative and positive lenses become greater so that aberration correction within the eyepiece lens group becomes difficult, and consequently, an image seen in the viewfinder frame becomes blurred. Further, the overall viewfinders aberration correction becomes difficult.

In the conditional formula (2) $-1.5 < f_E/r_{E1} < 1.0$, wherein $r_{E1}$ designates the radius of the eye-side surface curvature of the negative lens of the eyepiece lens group, if the value of the conditional formula (2) is above the upper limit, the light rays of the bright light source from the eye side are reflected and converged into the eye and if the value is below the lower limit, aberration correction becomes difficult.

The conditional formula (3) $0.03 < d_{E1-2}/f_E < 0.1$, wherein $d_{E1-2}$ designates the distance, between the negative lens and the positive lens of the eyepiece lens group, mainly relates to the condition of the diopter adjustment. In the case of a zooming objective lens group in particular, the diopter tends to deviate from the standard point due to the dimensional errors in the production processes of each objective lens element and/or errors of lens element shapes. Such a diopter deviation will preferably be adjusted only by the axial movement of a double-convex lens of the eyepiece lens group.

If the value of the conditional formula (3) is above the upper limit, the size of the eyepiece lens group becomes large; and if it is below the lower limit, it is hard to obtain a large angular magnification of this eyepiece lens group, and also the diopter adjustment range becomes smaller.

In the case of an objective lens group, having a variable power as large as 30 degrees in half angle of view on the wide angle end while at the same time being miniaturized, it is advantageous to have a two-group inverted telephoto or retro-focus configuration having a first negative lens group and a second positive lens group from the object side. Miniaturization of the optics can be achieved by making the power of the first negative lens group and second positive lens group greater than that of the eyepiece, as specifically shown in conditional formulas (4) and (5) below.

If the value of the conditional formula (4) $-2.5 < f_E/f_{1G} < -1.5$, wherein $f_{1G}$ designates the focal length of the first negative lens group of the objective, is above the upper limit, or in case the value of the conditional formula (5) $1.3 < f_E/f_{2G} < 2.3$, wherein $f_{2G}$ designates the focal length of the second positive lens group of the objective, is below the lower limit, the power of each lens group becomes too small to achieve miniaturization and the overall power of the objective lens group tends to be smaller in comparison with the eyepiece. Therefore, the angular magnification also tends to be small. On the other hand, if the value of the conditional formula (4) is below the lower limit and/or the value of the conditional formula (5) is above the upper limit, the power of each lens group becomes too large. Although this is advantageous for miniaturization of the system, a large magnitude of aberrational deviation occurs when the focal length is varied.

To achieve the miniaturization of the real image type viewfinder, it is advantageous to have a first negative lens group of the objective lens group comprising a single negative lens. In a conventional real image type viewfinder with a half angle of view of over 30 degrees and which consists of a single negative lens, aberration correction is difficult. According to the present invention, aberrations can be well corrected by a first negative lens group comprising a double-aspheric lens having both surfaces shifted toward the object.

In the conditional formula (6) $-0.05 < \Delta X_{1-1}/f_{OW} < 0$, $\Delta X_{1-1}$ designates the aspheric value of the effective radius of the first surface facing the object of the double-aspheric lens, and $f_{OW}$ designates the overall wide angle focal length of the lens groups from the objective to the condenser lens at the wide extremity. In the conditional formula (7) $-0.10 < \Delta X_{1-2}/f_{OW} < 0$, $\Delta X_{1-2}$ designates the aspheric value of the effective radius of the second surface facing the eye of the double-aspheric lens. Formulas (6) and (7) are the conditions for the aberration correction of the double-aspheric lens. If the values of these conditional formulas are above the upper limit, the corrections of the astigmatism and the field of curvature at wide angle are difficult and if they are below the lower limit, the aberrations are over corrected.

It is desirable to position an aberration correction lens between the variable power lens group (i.e., objective lens group) and the condenser lens, and to have fewer lens elements in the variable power lens group so as to miniaturize the objective lens group.

In conditional formula (8) $f_{OW}/|f_F| < 0.2$, $f_F$ designates the focal length of the aberration correction lens. In conditional formula (9) $-0.1 < \Delta X_{c-1}/f_{OW} < 0$, $\Delta X_{c-1}$ designates the aspheric value in the effective radius of the first surface facing the object of the aberration correction lens. In conditional formula (10) $-0.15 < \Delta X_{c-2}/f_{OW} < 0$, $\Delta X_{c-2}$ designates the aspheric value in the effective radius of the second surface facing the eye of the aberration correction lens. Formulas (8), (9) and (10) are the conditions relating to the aberration correction lens. If the value of the conditional formula (8) is above the upper limit, the power of the correction lens, which is positioned at a distance from the image forming plane unlike a condenser lens, becomes too large for correcting aberrations.

It is desirable to have an aberration correction lens comprising a double-aspheric lens. The conditional formulas (9) and (10) are related to the aspheric surfaces. If both surfaces are aspherically formed and are shifting toward the object with the aspheric values less than the upper limit of the formulas, the corrections of astigmatism and field of curvature at the telephoto setting in particular, can be achieved effectively. If the values are below the lower limits, spherical aberration and coma will be over-corrected.

EMBODIMENT 1

(1st example)

Figure 3:
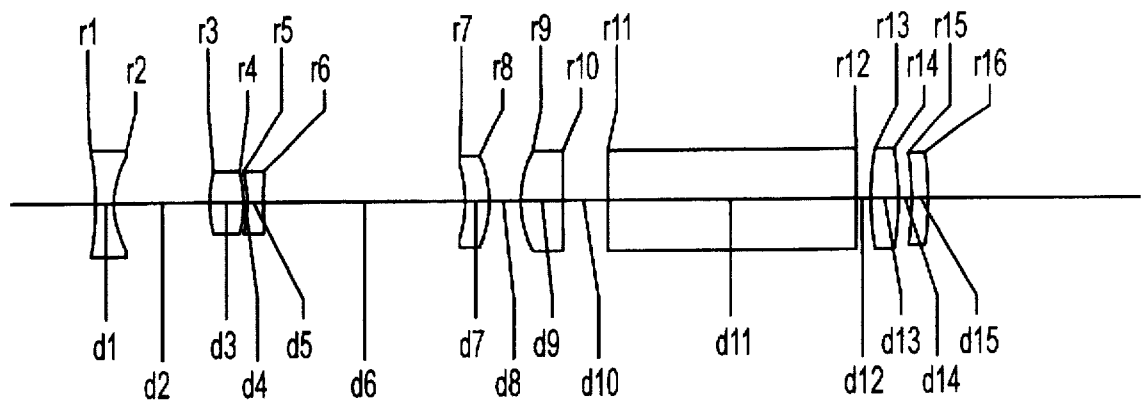
FIG. 3 is a diagram of a real image type viewfinder of FIG. 1 showing telescopic settings according to the present invention.

FIGS. 1 and 3 show the lens arrangements of a real image type zoom viewfinder according to the first embodiment of the present invention. FIG. 1 shows the wide angle end setting and FIG. 3 shows the telephoto end setting. An objective lens group includes a negative lens 11 and a two-element, overall positive lens group 12. Behind the lens group 12, a field of curvature correction lens 13, condenser lens 14 and an image erecting optical system consisting of a Porro prism 15 are provided. An eyepiece lens system consists of a positive double-convex lens 16 and a negative lens 17.

Figure 2:
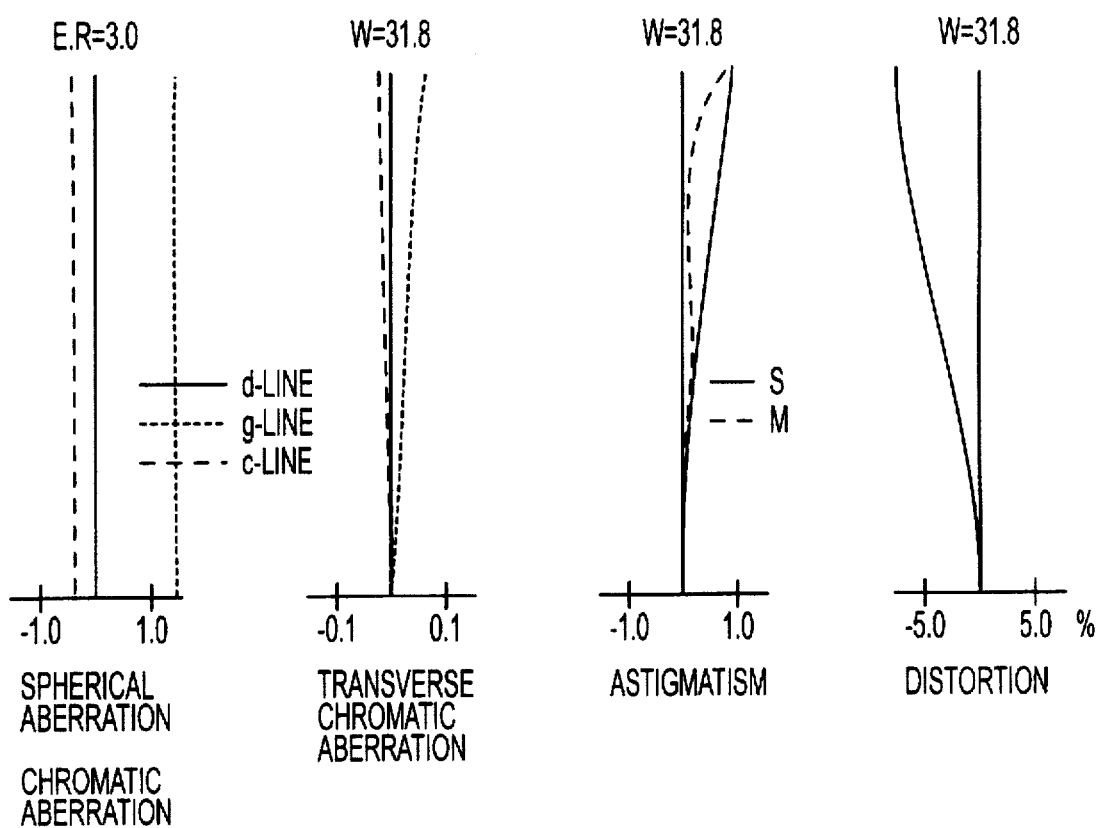
FIG. 2 is a diagram of aberrations in the viewfinder of FIG. 1 according to the present invention.
Figure 4:
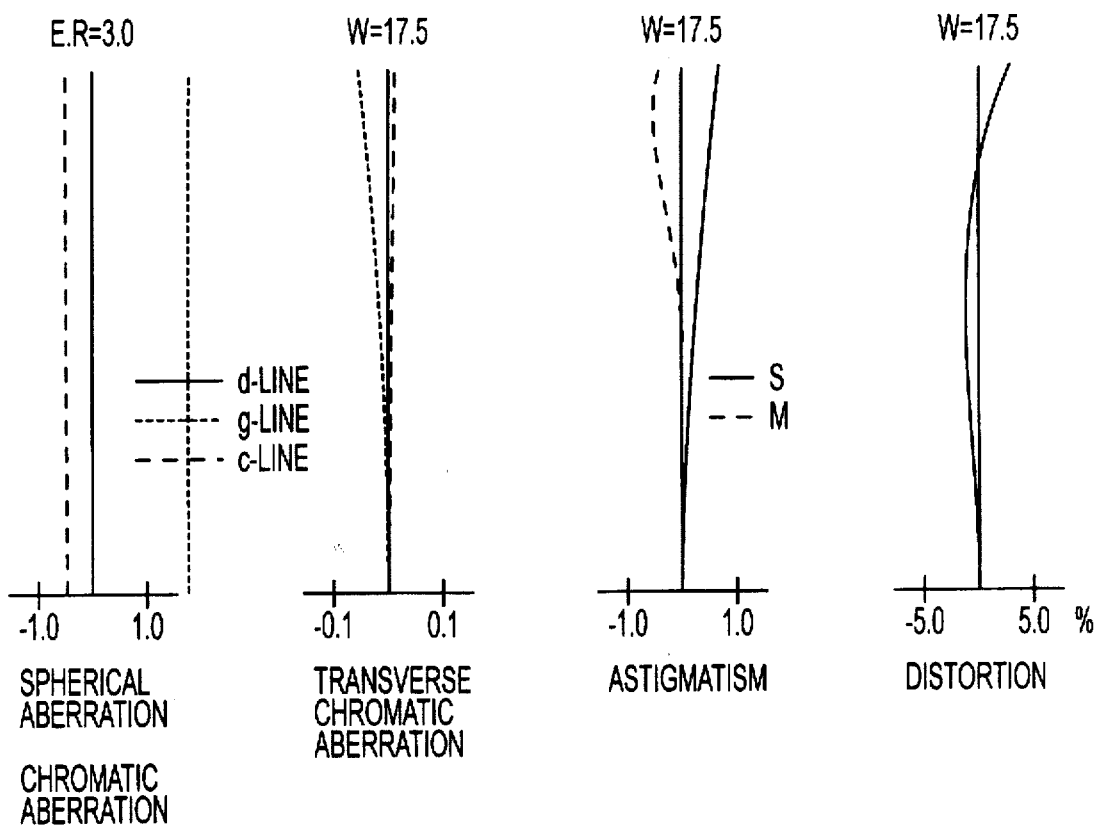
FIG. 4 is a diagram of aberrations in the viewfinder of FIG. 3 according to the present invention.

Table 1 shows concrete data of the lens system of the first embodiment of the present invention. FIG. 2 shows the various aberrations of the lens system of FIG. 1 at the wide angle end setting. FIG. 4 shows the various aberrations of the lens system of FIG. 3 at the telephoto end setting. In the aberration diagrams, "d-line", "g-line" and "c-line" designate the spherical aberrations at the respective wavelengths (i.e., chromatic aberration) and the transverse chromatic aberrations. "S" designates the distortion in the sagittal direction. "M" designates the distortion in the meridional direction.

In the tables and figures, "$r_i$" designates a radius of curvature of each lens surface, "$d_i$" designates the thickness of a lens or the distance between lenses, "N" designates the refractive index, and "$\nu$" designates Abbe number.

TABLE 1

Half effective angle of view ω = 31.8 to 17.5 degrees
("2ω" is effective angle of view)
Eye ring ER = 3.0 diameter
Eye relief = 12.0
Finder image magnification = 0.34 to 0.59 X
Diopter = −1.0 to −1.0 (is maintained at −1.0)

| surface No. | r | d | N | ν |
|---|---|---|---|---|
| 1 * | −26.146 | 1.50 | 1.49176 | 57.4 |
| 2 * | 6.944 | 15.46–8.47 (variable) | | |
| 3 * | 10.139 | 2.80 | 1.49176 | 57.4 |
| 4 | −8.190 | 0.20 | | |
| 5 | −13.636 | 1.50 | 1.58547 | 29.9 |
| 6 * | −23.026 | 11.26–17.65 (variable) | | |
| 7 * | −86.734 | 2.00 | 1.49176 | 57.4 |
| 8 * | −93.622 | 2.88 | | |
| 9 | 11.050 | 3.50 | 1.49176 | 57.4 |
| 10 | ∞ | 4.00 | | |
| 11 | ∞ | 21.70 | 1.49176 | 57.4 |
| 12 | ∞ | 1.20 | | |
| 13 * | 19.770 | 2.60 | 1.49176 | 57.4 |
| 14 | −14.630 | 1.20 | | |
| 15 | −14.630 | 1.20 | 1.49176 | 57.4 |
| 16 | −21.312 | — | | |

* aspherical surface
surface No. 1; K = 0.0, A4 = −0.37060 × $10^{-3}$, A6 = 0.20570 × $10^{-4}$, A8 = −0.26160 × $10^{-6}$, A10 = 0.0, A12 = 0.0
surface No. 2; K = 0.0, A4 = −0.10590 × $10^{-2}$, A6 = 0.28030 × $10^{-4}$, A8 = 0.0, A10 = 0.0, A12 = 0.0
surface No. 3; K = 0.0, A4 = −0.55540 × $10^{-3}$, A6 = −0.57840 × $10^{-5}$, A8 = −0.18310 × $10^{-6}$, A10 = 0.0, A12 = 0.0
surface No. 6; K = 0.0, A4 = 0.0, A6 = −0.23270 × $10^{-5}$, A8 = −0.31210 × $10^{-6}$, A10 = 0.0, A12 = 0.0
surface No. 7; K = 0.0, A4 = −0.38300 × $10^{-2}$, A6 = 0.27480 × $10^{-4}$, A8 = 0.0, A10 = 0.0, A12 = 0.0
surface No. 8; K = 0.0, A4 = −0.43950 × $10^{-2}$, A6 = 0.13210 × $10^{-3}$, A8 = −0.21150 × $10^{-5}$, A10 = 0.0, A12 = 0.0
surface No. 13; K = 0.0, A4 = −0.94290 × $10^{-4}$, A6 = 0.31000 × $10^{-6}$, A8 = −0.58520 × $10^{-8}$, A10 = 0.0, A12 = 0.0

EMBODIMENT 2

(2nd example)

Figure 5:
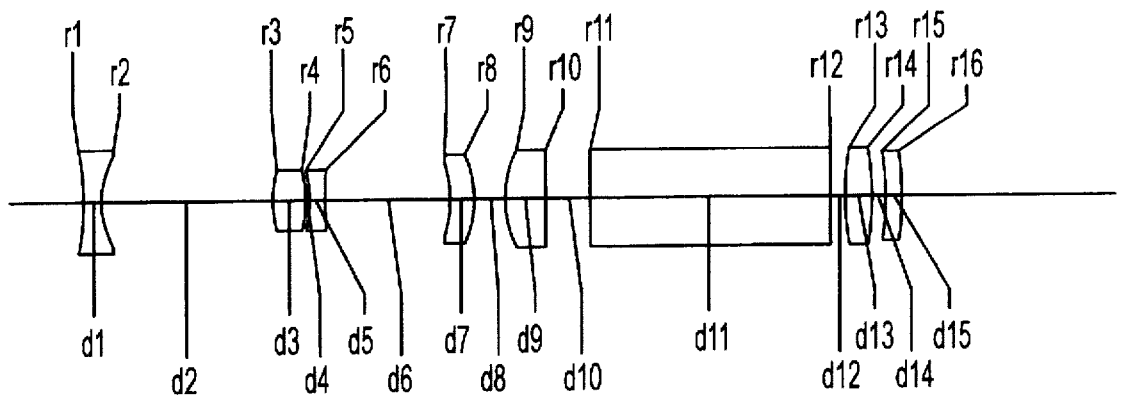
FIG. 5 is a diagram of a second embodiment of a real image type viewfinder showing wide angle settings according to the present invention.
Figure 7:
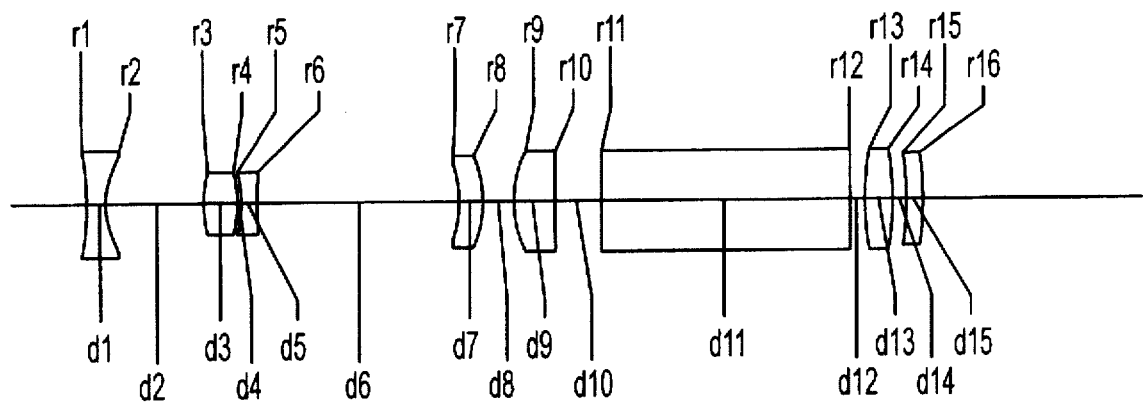
FIG. 7 is a diagram of a real image type viewfinder of FIG. 5 showing telescopic settings according to the present invention.

FIGS. 5 and 7 show the lens arrangement of a real image type viewfinder according to the second embodiment of the present invention. FIG. 5 shows the lens at a wide angle end setting and FIG. 7 shows the same at a telephoto end setting. In this example, the lens arrangement from objective lens group 11 to image erecting optical system 15 are the same as the first example, however the, double-convex positive lens 16 and the negative lens 17 are different from the first example.

Figure 6:
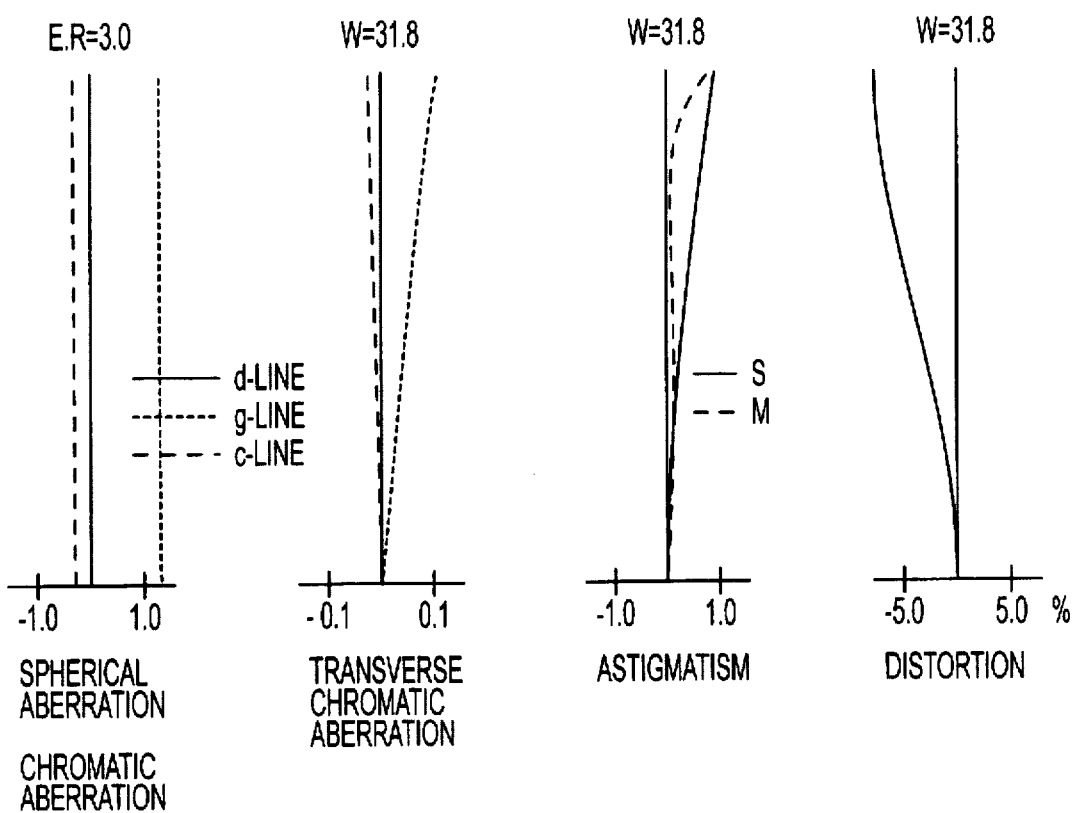
FIG. 6 is a diagram of aberrations in the viewfinder of FIG. 5 according to the present invention.
Figure 8:
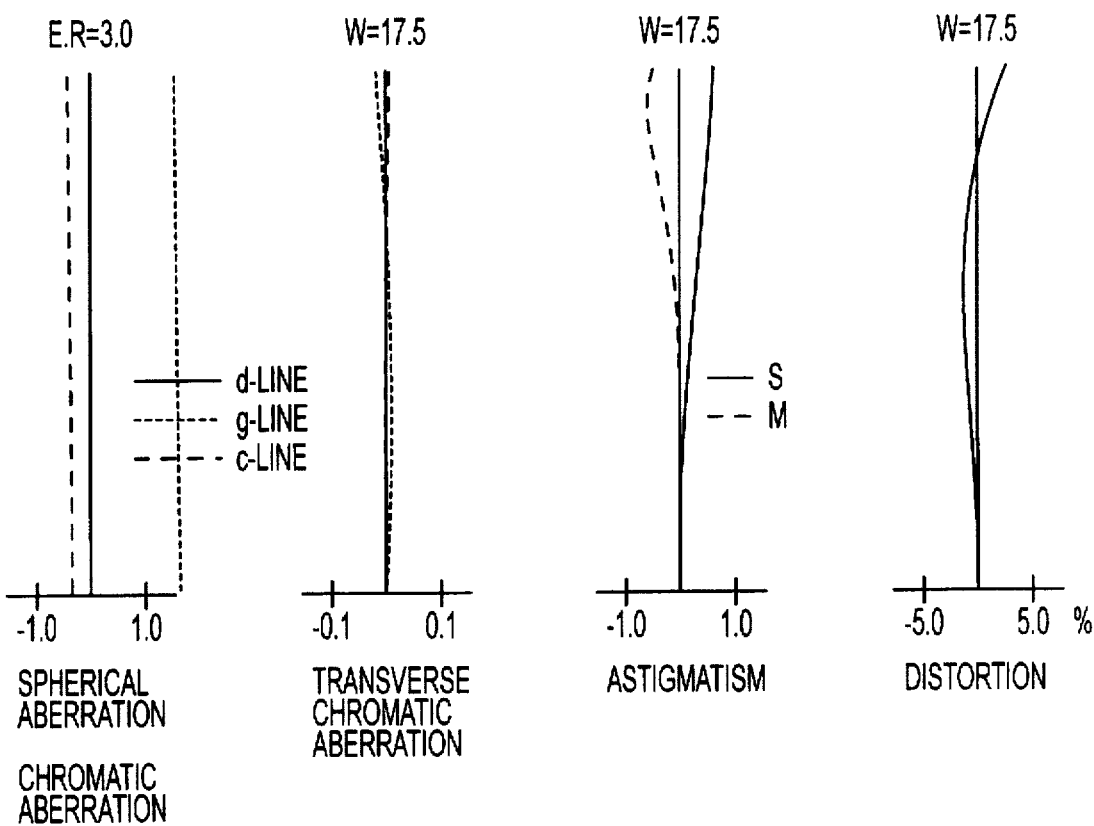
FIG. 8 is a diagram of aberrations in the viewfinder of FIG. 7 according to the present invention.

Table 2 shows the concrete lens data of the lens system. FIG. 6 shows the various aberrations of the lens system of FIG. 5 at the wide angle end setting. FIG. 8 shows the various aberrations of the lens system of FIG. 7 at the telephoto end setting.

TABLE 2

Half effective angle of view ω = 31.8 to 17.5 degrees
Eye ring ER = 3.0 diameter
Eye relief = 12.0
Finder image magnification = 0.34 to 0.59 X
Diopter = −1.05 to −1.05 (is maintained at −1.05)

| surface No. | r | d | N | ν |
|---|---|---|---|---|
| 1 * | −26.146 | 1.50 | 1.49176 | 57.4 |
| 2 * | 6.944 | 15.46–8.46 (variable) | | |
| 3 * | 10.139 | 2.80 | 1.49176 | 57.4 |
| 4 | −8.190 | 0.20 | | |
| 5 | −13.636 | 1.50 | 1.58547 | 29.9 |
| 6 * | −23.026 | 11.26–17.67 (variable) | | |
| 7 * | −86.734 | 2.00 | 1.49176 | 57.4 |
| 8 * | −93.622 | 2.88 | | |
| 9 | 11.050 | 3.50 | 1.49176 | 57.4 |
| 10 | ∞ | 4.00 | | |
| 11 | ∞ | 21.70 | 1.49176 | 57.4 |
| 12 | ∞ | 1.20 | | |
| 13 * | 19.770 | 2.60 | 1.49176 | 57.4 |
| 14 | −14.630 | 1.20 | | |
| 15 | −14.630 | 1.20 | 1.58547 | 29.9 |
| 16 | −20.054 | — | | |

* aspherical surface
surface No. 1; K = 0.0, A4 = −0.37060 × $10^{-3}$, A6 = 0.20570 × $10^{-4}$, A8 = −0.26160 × $10^{-6}$, A10 = 0.0, A12 = 0.0
surface No. 2; K = 0.0, A4 = −0.10590 × $10^{-2}$, A6 = 0.28030 × $10^{-4}$, A8 = 0.0, A10 = 0.0, A12 = 0.0
surface No. 3; K = 0.0, A4 = −0.55540 × $10^{-3}$, A6 = −0.57840 × $10^{-5}$, A8 = −0.18310 × $10^{-6}$, A10 = 0.0, A12 = 0.0
surface No. 6; K = 0.0, A4 = 0.0, A6 = −0.23270 × $10^{-5}$, A8 = −0.31210 × $10^{-6}$, A10 = 0.0, A12 = 0.0
surface No. 7; K = 0.0, A4 = −0.38300 × $10^{-2}$, A6 = 0.27480 × $10^{-4}$, A8 = 0.0, A10 = 0.0, A12 = 0.0
surface No. 8; K = 0.0, A4 = −0.43950 × $10^{-2}$, A6 = 0.13210 × $10^{-3}$, A8 = −0.21150 × $10^{-5}$, A10 = 0.0, A12 = 0.0
surface No. 13; K = 0.0, A4 = −0.94290 × $10^{-4}$, A6 = 0.31000 × $10^{-6}$, A8 = −0.58520 × $10^{-8}$, A10 = 0.0, A12 = 0.0

EMBODIMENT 3

(3rd example)

Figure 9:
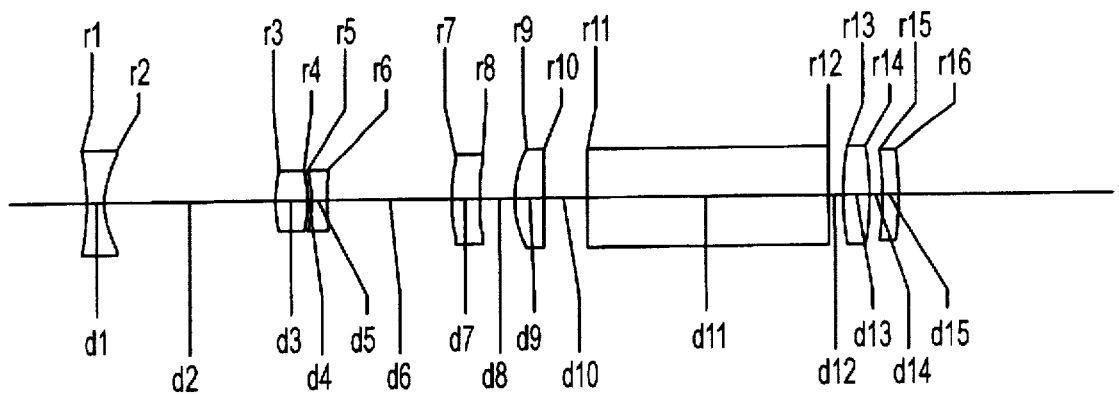
FIG. 9 is a diagram of a third embodiment of a real image type viewfinder showing wide angle settings according to the present invention.
Figure 11:
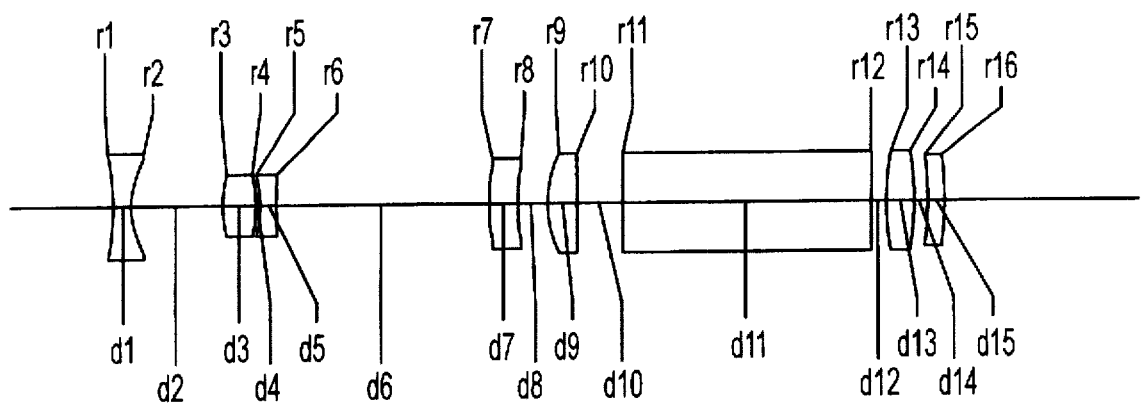
FIG. 11 is a diagram of a real image type viewfinder of FIG. 9 showing telescopic settings according to the present invention.

FIGS. 9 and 11 show the lens arrangement of a real image type viewfinder according to the third embodiment of the present invention. FIG. 9 shows the lens at a wide angle end setting and FIG. 11 shows the same at telephoto end setting. In this example, the lens arrangement from objective lens group 11 to the image erecting optical system 15, the positive double-convex lens 16 and the negative lens 17 are all different from the first and second examples.

Figure 10:
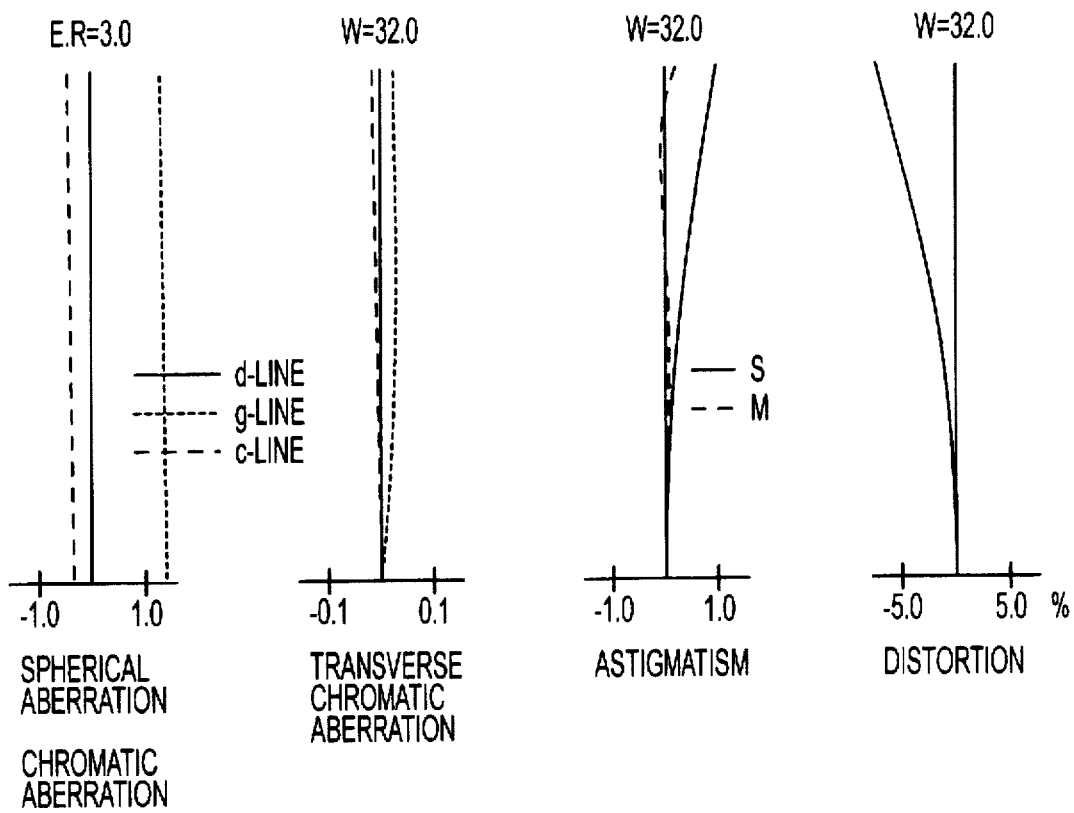
FIG. 10 is a diagram of aberrations in the viewfinder of FIG. 9 according to the present invention.
Figure 12:
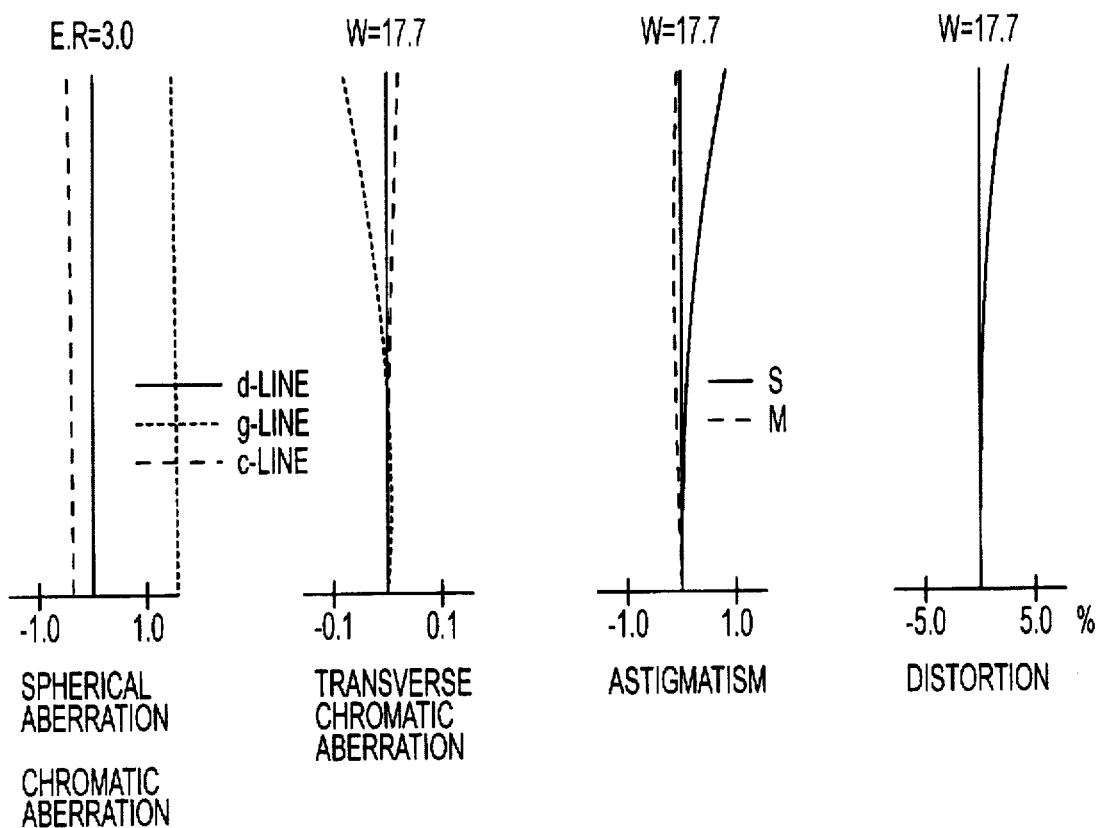
FIG. 12 is a diagram of aberrations in the viewfinder shown in FIG. 11 according to the present invention.

Table 3 shows the concrete lens data of the lens system. FIG. 10 shows the various aberrations of the lens system of FIG. 9 at the wide angle end setting. FIG. 12 shows the various aberrations of the lens system of FIG. 11 at the telephoto end setting.

TABLE 3

Half effective angle of view ω = 32.0 to 17.7 degrees
Eye ring ER = 3.0 diameter
Eye relief = 11.0
Finder image magnification = 0.34 to 0.60 X
Diopter = −1.0 to −1.0 (is maintained at −1.0)

| surface No. | r | d | N | ν |
|---|---|---|---|---|
| 1 * | −84.257 | 1.50 | 1.49176 | 57.4 |
| 2 * | 6.297 | 15.46–8.39 (variable) | | |
| 3 * | 9.166 | 2.80 | 1.49176 | 57.4 |
| 4 | −8.336 | 0.20 | | |
| 5 | −8.043 | 1.50 | 1.58547 | 29.9 |
| 6 * | −12.670 | 11.18–18.35 (variable) | | |
| 7 * | 10.148 | 2.50 | 1.49176 | 57.4 |
| 8 * | −15.767 | 3.05 | | |
| 9 | 13.165 | 2.50 | 1.49176 | 57.4 |
| 10 | ∞ | 4.00 | | |

TABLE 3-continued

Half effective angle of view ω = 32.0 to 17.7 degrees
Eye ring ER = 3.0 diameter
Eye relief = 11.0
Finder image magnification = 0.34 to 0.60 X
Diopter = −1.0 to −1.0 (is maintained at −1.0)

| surface No. | r | d | N | v |
|---|---|---|---|---|
| 11 | ∞ | 21.70 | 1.49176 | 57.4 |
| 12 | ∞ | 1.20 | | |
| 13 * | 15.326 | 2.60 | 1.49176 | 57.4 |
| 14 | −14.868 | 1.20 | | |
| 15 | −30.000 | 1.20 | 1.49176 | 57.4 |
| 16 | ∞ | — | | |

* aspherical surface
surface No. 1; K = 0.0, A4 = −0.45863 × 10$^{-3}$, A6 = 0.11551 × 10$^{-4}$, A8 = −0.70129 × 10$^{-7}$, A10 = 0.0, A12 = 0.0
surface No. 2; K = 0.0, A4 = −0.12792 × 10$^{-2}$, A6 = 0.12798 × 10$^{-4}$, A8 = 0.0, A10 = 0.0, A12 = 0.0
surface No. 3; K = 0.0, A4 = −0.18842 × 10$^{-2}$, A6 = 0.45735 × 10$^{-5}$, A8 = 0.0, A10 = 0.0, A12 = 0.0
surface No. 6; K = 0.0, A4 = 0.16119 × 10$^{-3}$, A6 = 0.39369 × 10$^{-5}$, A8 = 0.0, A10 = 0.0, A12 = 0.0
surface No. 7; K = 0.0, A4 = −0.99484 × 10$^{-3}$, A6 = −0.66867 × 10$^{-4}$, A8 = 0.0, A10 = 0.0, A12 = 0.0
surface No. 8; K = 0.0, A4 = −0.11271 × 10$^{-2}$, A6 = −0.85236 × 10$^{-4}$, A8 = 0.17296 × 10$^{-5}$, A10 = 0.0, A12 = 0.0
surface No. 13; K = 0.0, A4 = −0.15848 × 10$^{-3}$, A6 = 0.31926 × 10$^{-6}$, A8 = −0.36849 × 10$^{-8}$, A10 = 0.0, A12 = 0.0

EMBODIMENT 4

(4th example)

Figure 13:
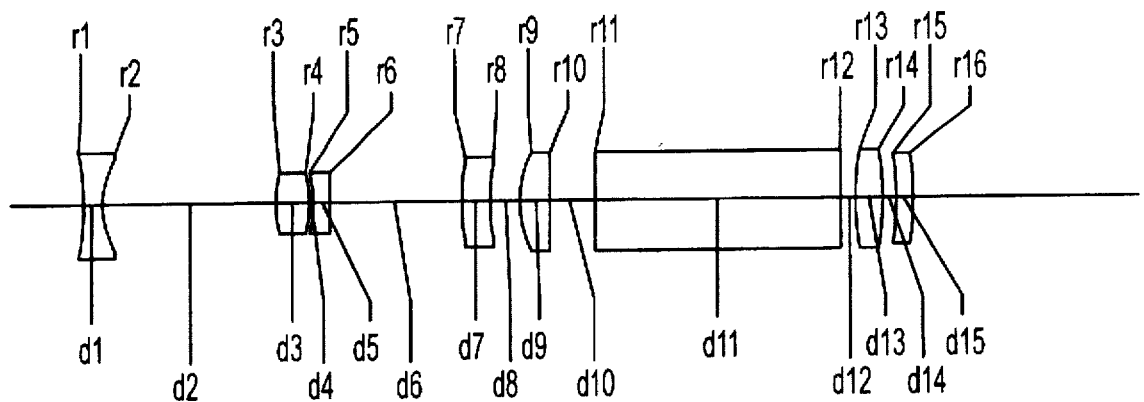
FIG. 13 is a diagram of a fourth embodiment of a real image type viewfinder showing wide angle settings according to the present invention.
Figure 15:
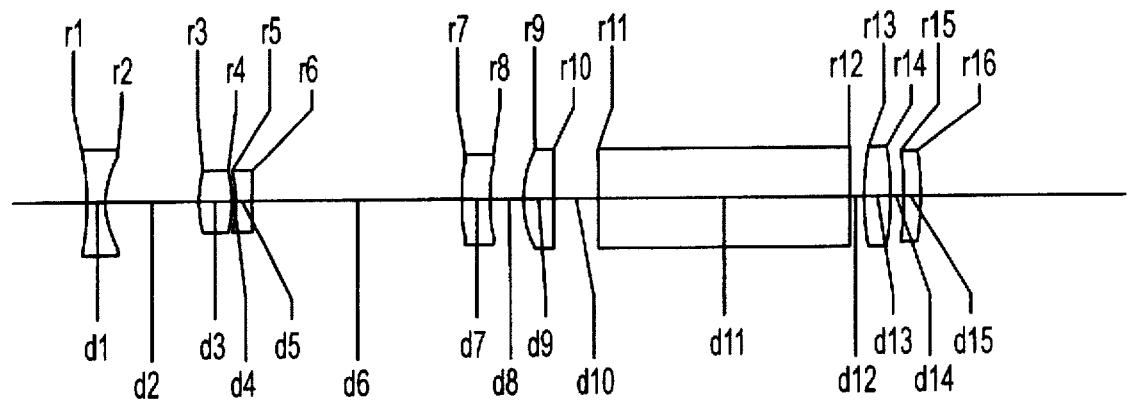
FIG. 15 is a diagram of a real image type viewfinder of FIG. 13 showing telescopic settings according to the present invention.

FIGS. 13 and 15 show the lens arrangement of a real image type viewfinder according to the fourth embodiment of the present invention. FIG. 13 shows the lens at the wide angle end setting, and FIG. 15 shows the same at the telephoto end setting. In this example, the lens arrangement from objective lens group 11 to image erecting optical system 15, the positive double-convex lens 16 and the negative lens 17 are all different from the first through third examples.

Figure 14:
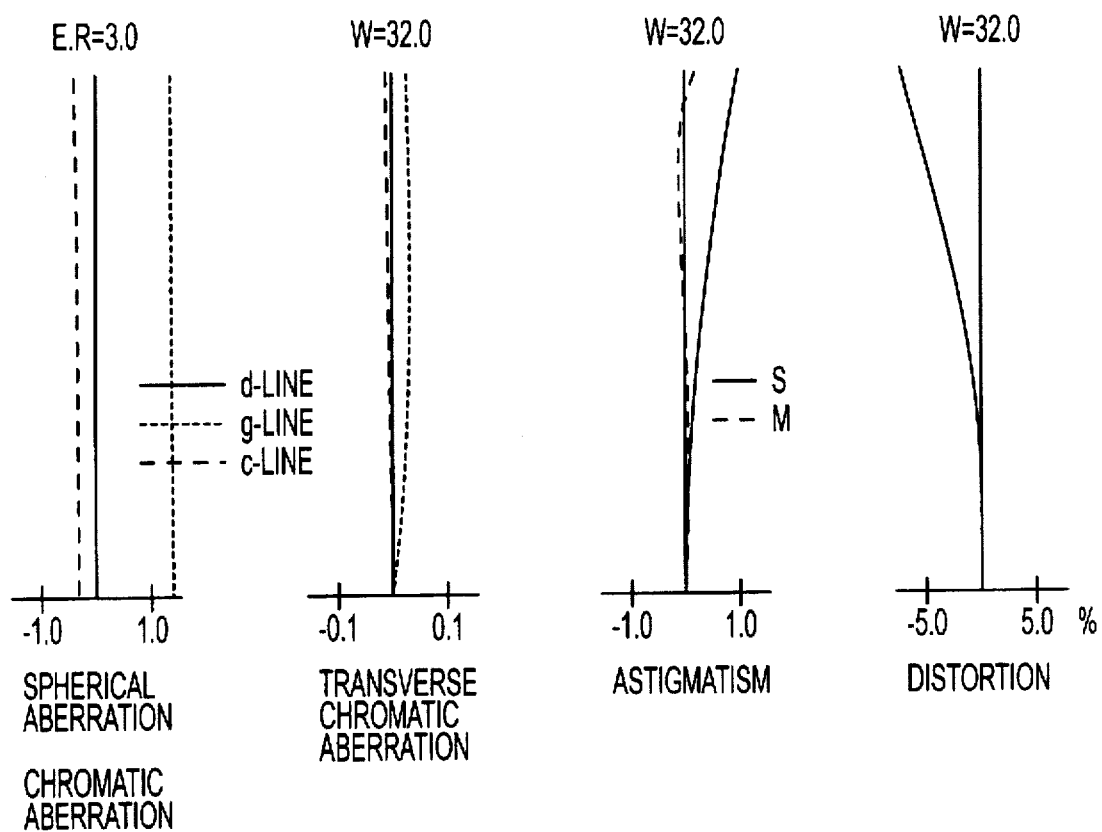
FIG. 14 is a diagram of aberrations in the viewfinder shown in FIG. 13 according to the present invention.
Figure 16:
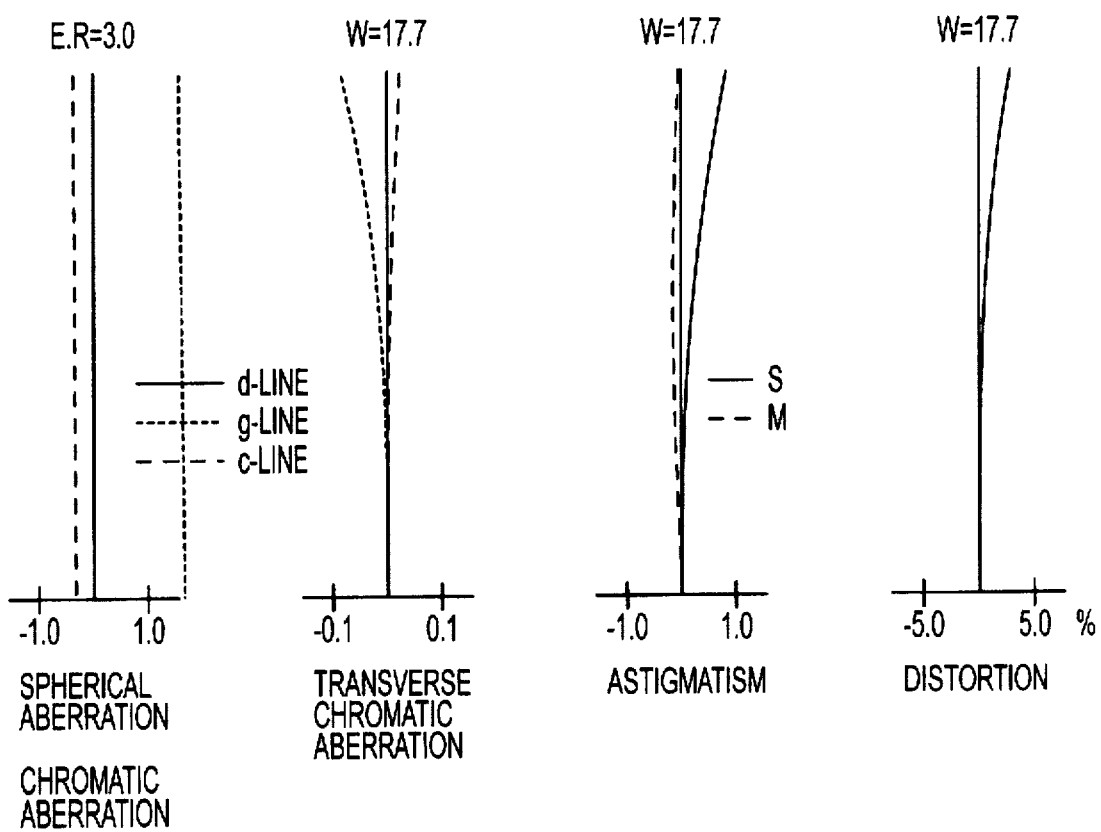
FIG. 16 is a diagram of aberrations in the viewfinder shown in FIG. 15 according to the present invention.

Table 4 shows the concrete lens data of the lens system. FIG. 14 shows the various aberrations of the lens system of FIG. 13 at the wide angle end setting. FIG. 16 shows the various aberrations of the lens system of FIG. 15 at the telephoto end setting.

TABLE 4

Half effective angle of view ω = 32.0 to 17.7 degrees
Eye ring ER = 3.0 diameter
Eye relief = 11.0
Finder image magnification = 0.34 to 0.60 X
Diopter = −1.0 to −1.0 (is maintained at −1.0)

| surface No. | r | d | N | v |
|---|---|---|---|---|
| 1 * | −81.551 | 1.50 | 1.49176 | 57.4 |
| 2 * | 6.282 | 15.46–8.41 (variable) | | |
| 3 * | 9.122 | 2.80 | 1.49176 | 57.4 |
| 4 | −8.360 | 0.20 | | |
| 5 | −8.086 | 1.50 | 1.58547 | 29.9 |
| 6 * | −12.750 | 11.27–18.33 (variable) | | |
| 7 * | 10.093 | 2.50 | 1.49176 | 57.4 |
| 8 * | 16.194 | 3.00 | | |
| 9 | 13.393 | 2.50 | 1.49176 | 57.4 |
| 10 | ∞ | 4.00 | | |
| 11 | ∞ | 21.70 | 1.49176 | 57.4 |
| 12 | ∞ | 1.20 | | |
| 13 * | 14.833 | 2.60 | 1.49176 | 57.4 |
| 14 | −15.351 | 1.20 | | |

TABLE 4-continued

Half effective angle of view ω = 32.0 to 17.7 degrees
Eye ring ER = 3.0 diameter
Eye relief = 11.0
Finder image magnification = 0.34 to 0.60 X
Diopter = −1.0 to −1.0 (is maintained at −1.0)

| surface No. | r | d | N | v |
|---|---|---|---|---|
| 15 | −60.000 | 1.20 | 1.49176 | 57.4 |
| 16 | 60.000 | — | | |

* aspherical surface
surface No. 1; K = 0.0, A4 = −0.45512 × 10$^{-3}$, A6 = 0.11691 × 10$^{-4}$, A8 = −0.73213 × 10$^{-7}$, A10 = 0.0, A12 = 0.0
surface No. 2; K = 0.0, A4 = −0.12734 × 10$^{-2}$, A6 = 0.13060 × 10$^{-4}$, A8 = 0.0, A10 = 0.0, A12 = 0.0
surface No. 3; K = 0.0, A4 = −0.18468 × 10$^{-3}$, A6 = −0.45025 × 10$^{-5}$, A8 = 0.0, A10 = 0.0, A12 = 0.0
surface No. 6; K = 0.0, A4 = 0.16505 × 10$^{-3}$, A6 = 0.40928 × 10$^{-5}$, A8 = 0.0, A10 = 0.0, A12 = 0.0
surface No. 7; K = 0.0, A4 = −0.97805 × 10$^{-3}$, A6 = 0.69494 × 10$^{-4}$, A8 = 0.0, A10 = 0.0, A12 = 0.0
surface No. 8; K = 0.0, A4 = −0.10771 × 10$^{-2}$, A6 = −0.90460 × 10$^{-4}$, A8 = −0.18294 × 10$^{-5}$, A10 = 0.0, A12 = 0.0
surface No. 13; K = 0.0, A4 = −0.17061 × 10$^{-3}$, A6 = 0.36095 × 10$^{-6}$, A8 = −0.35892 × 10$^{-8}$, A10 = 0.0, A12 = 0.0

Following Table 5 shows the corresponding data of the conditional formulas of example 1 to 4.

TABLE 5

| | Example 1, | Example 2, | Example 3, | Example 4 |
|---|---|---|---|---|
| $f_B/f_{B1}$ | −0.21 | −0.21 | −0.33 | −0.33 |
| $f_B/r_{B1}$ | −1.00 | 1.06 | 0.0 | 0.34 |
| $d_{B1-2}/f_B$ | 0.057 | 0.056 | 0.059 | 0.059 |
| $f_{OW}$ | 7.15 | 7.15 | 6.87 | 6.81 |
| $f_{OT}$ | 12.60 | 12.60 | 12.12 | 12.02 |
| $f_{1O}$ | −10.99 | −10.99 | −11.85 | 11.79 |
| $f_{2O}$ | 11.63 | 11.63 | 12.27 | 12.25 |
| $f_F$ | −2651.1 | −2651.1 | 50.50 | 48.00 |
| $f_{CO}$ | 22.47 | 22.47 | 26.77 | 27.24 |
| $f_B$ | 21.20 | 21.30 | 20.37 | 20.20 |
| $f_B/f_{1O}$ | −1.93 | −1.93 | −1.72 | −1.72 |
| $f_B/f_{2O}$ | 1.82 | 1.82 | 1.66 | 1.65 |
| $f_{OW}/f_F$ | −0.003 | −0.003 | 0.136 | 0.142 |
| $\Delta X_{1-1}/f_{OW}$ | −0.0029 | −0.0029 | −0.0206 | −0.0203 |
| $\Delta X_{1-2}/f_{OW}$ | −0.0194 | −0.0194 | −0.0457 | −0.0454 |
| $\Delta X_{C-1}/f_{OW}$ | −0.070 | −0.070 | −0.052 | −0.051 |
| $\Delta X_{C-2}/f_{OW}$ | −0.093 | −0.093 | −0.073 | −0.072 |

As can be understood from data shown in Table 5, the values of examples 1 to 4 satisfy the conditional formulas (1) to (10). Also as shown in the aberration diagrams, various aberrations of the real image type viewfinder according to the present invention are well corrected.

We claim:
1. A real image type viewfinder, comprising:
an objective lens group;
an eyepiece lens group;
a condenser lens group for transmitting an image of an object formed by said objective lens group towards said eyepiece lens group; and
an image erecting optical system for erecting an inverted image,
said objective lens group, said condenser lens group, said image erecting optical system and said eyepiece lens group being located in this order from the object side,
said objective group consisting of a first negative lens group and a second positive lens group located in this order from the object, said first negative lens group and said second positive lens group together forming a movable variable focal length lens group satisfying the following relationships:

$$-2.5 < f_E/f_{1G} < -1.5$$

$$1.3 < f_E/f_{2G} < 2.3$$

wherein $f_E$ designates the overall focal length of said eyepiece lens group, $f_{1G}$ designates the focal length of said first negative lens group and $f_{2G}$ designates the focal length of said second positive lens group; and a weak power aberration correction lens located between said variable focal length lens group and said condenser lens and satisfying the following conditional relationship:

$$f_{OW}/|f_F| < 0.2$$

wherein $f_{OW}$ represents an overall focal length of the lens groups from said objective lens group to said condenser lens group at a wide angle setting, and $f_F$ represents a focal length of said aberration correction lens.

2. The real image type viewfinder of claim 1, wherein, said aberration correction lens comprises a double-aspheric lens which satisfies the following relationships:

$$-0.1 < \Delta X_{C-1}/f_{OW} < 0$$

$$-0.15 < \Delta X_{C-2}/f_{OW} < 0$$

wherein $f_{OW}$ designates the overall focal length of the lens groups from the objective lens group to the condenser lens group at a wide angle setting;

$\Delta X_{C-1}$ designates the aspheric value in the effective radius of a first surface of the aberration correction lens, said first surface facing an object side of said viewfinder; and $\Delta X_{C-2}$ designates the aspheric value in the effective radius of a second surface of the aberration correction lens, said second surface facing an eve side of said viewfinder.

* * * * *